(12) United States Patent
Nakahira et al.

(10) Patent No.: US 7,187,409 B2
(45) Date of Patent: Mar. 6, 2007

(54) LEVEL DIFFERENCE CORRECTING METHOD AND IMAGE PICK-UP DEVICE USING THE METHOD

(75) Inventors: Toshiaki Nakahira, Tokyo (JP); Akihiro Yoshida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 560 days.

(21) Appl. No.: 10/137,638

(22) Filed: May 3, 2002

(65) Prior Publication Data

US 2002/0196353 A1  Dec. 26, 2002

(30) Foreign Application Priority Data

May 29, 2001 (JP) ............... 2001-161323

(51) Int. Cl.
*H04N 9/64* (2006.01)
(52) U.S. Cl. ............ 348/243; 358/529; 348/221.1; 348/234
(58) Field of Classification Search ........... 358/529; 348/243, 244–248

See application file for complete search history.

(56) References Cited

U.S. PATENT DOCUMENTS 4,875,098 A * 10/1989 Yamamoto et al. ......... 348/250
6,084,634 A * 7/2000 Inagaki et al. ............. 348/294

FOREIGN PATENT DOCUMENTS

JP  5-110941  4/1993
JP  2000-152098  5/2000

OTHER PUBLICATIONS

U.S. Appl. No. 10/137,638, filed May 3, 2002, Nakahira et al.
U.S. Appl. No. 10/802,801, filed Mar. 18, 2004, Nakahira.
U.S. Appl. No. 10/764,449, filed Jan. 27, 2004, Ojima et al.
U.S. Appl. No. 10/725,401, Dec. 3, 2003, Yoshida.
U.S. Appl. No. 10/386,568, Mar. 13, 2003, Yoshida et al.
U.S. Appl. No. 10/354,086, Jan. 30, 2003, Ojima et al.

* cited by examiner

*Primary Examiner*—Ngoc-Yen Vu
*Assistant Examiner*—Anthony Daniels
(74) *Attorney, Agent, or Firm*—Oblon, Spivak, McClelland, Maier & Neustadt, P.C.

(57) ABSTRACT

An OB level difference is calculated from the luminance signal levels of at least two frames which are exposed for proper exposure time and for exposure time different from the proper exposure time, and the OB level difference is corrected in an input step of a signal processing circuit. Calculation of the OB level difference is performed regularly from immediately after power on of the equipment, the OB level difference obtained in each frame is multiplied, and a value obtained by dividing the multiplied OB level difference by the number of sampled frames is designated as a correction value.

32 Claims, 14 Drawing Sheets

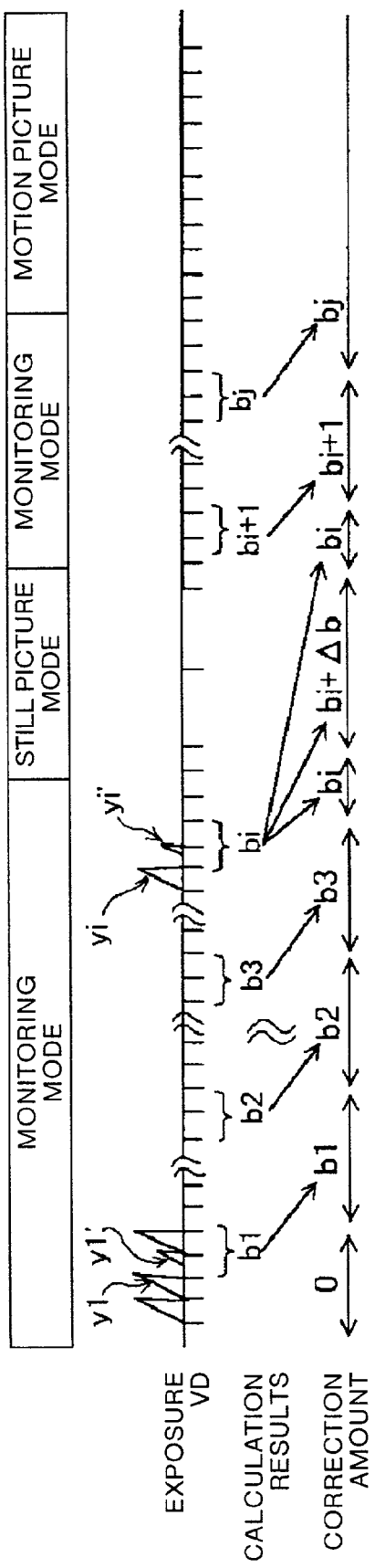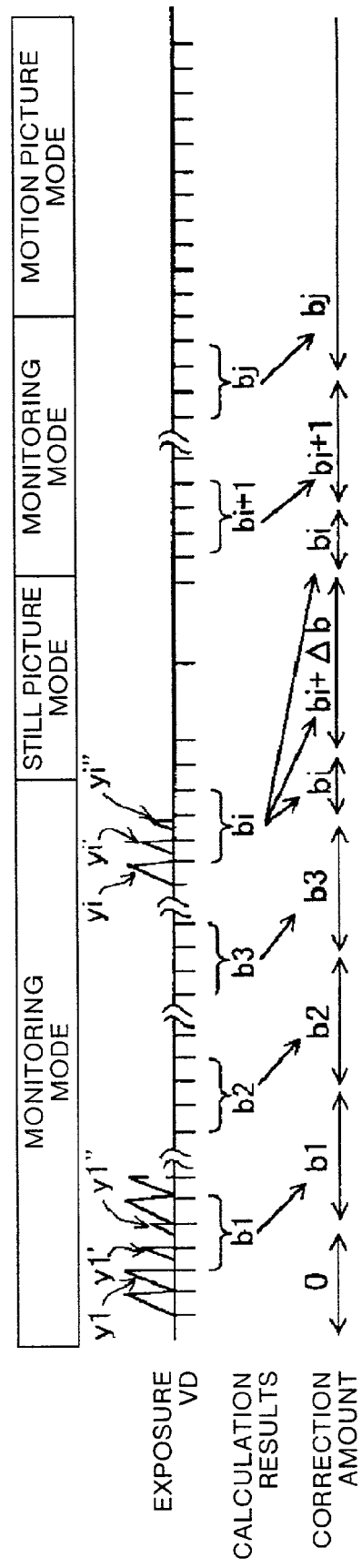

OB CORRECTION AMOUNT : $Bi=(b1+b2+b3)/3$

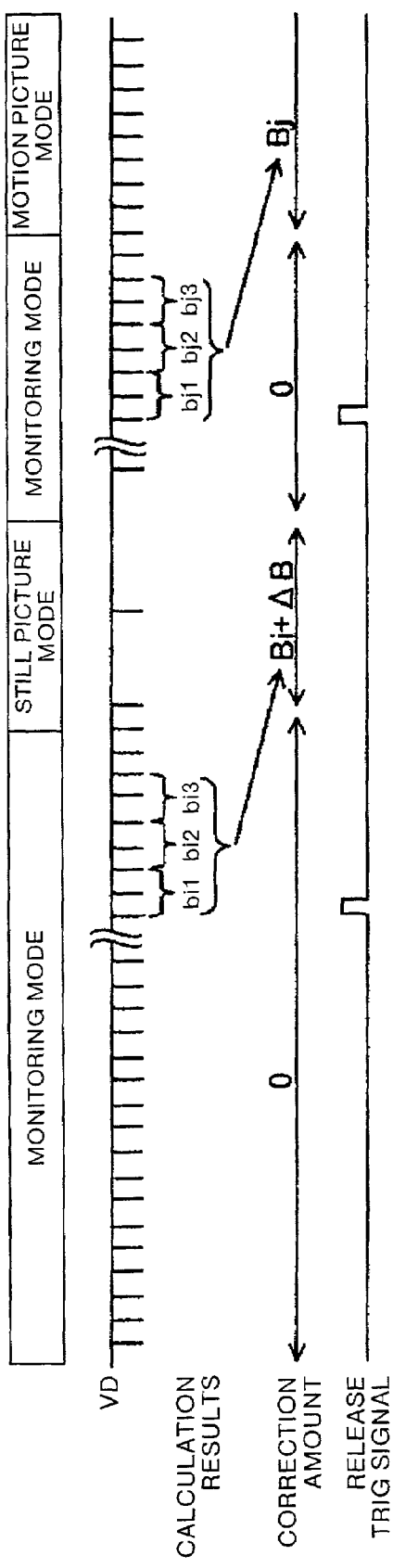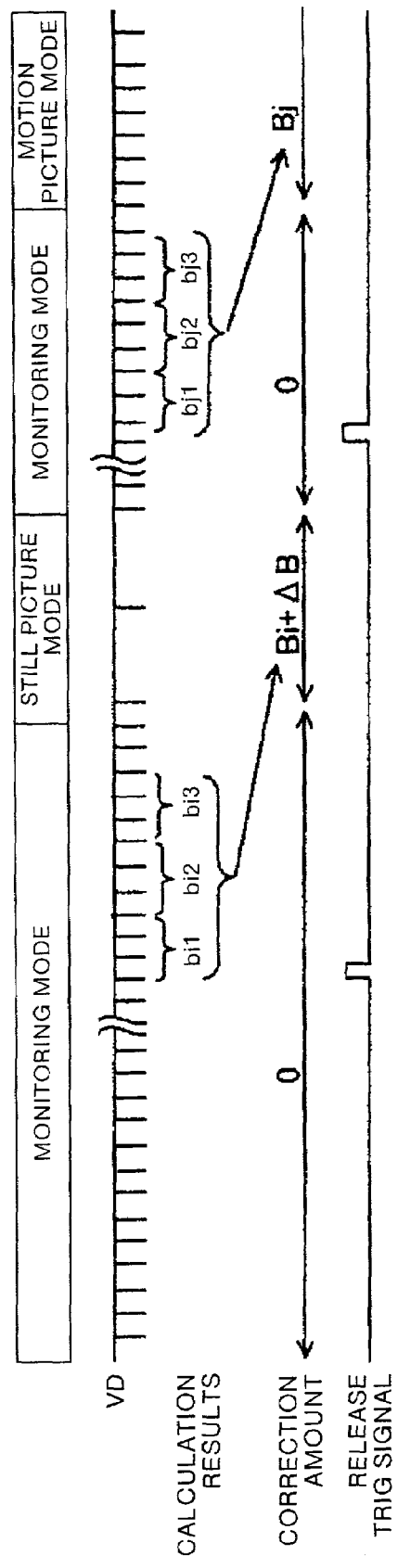

① WHITE CLOUD SHOWING THE LUMINANCE IS AT THE SATURATION LEVEL

② WHITE SHIRT PORTION OF A PERSON

LEVEL DIFFERENCE CORRECTING METHOD AND IMAGE PICK-UP DEVICE USING THE METHOD

FIELD OF THE INVENTION

The present invention relates to correction of level difference in black level, which is a difference ("OB level difference") between an optical black level of a CCD image pickup device and a black level of a picture signal.

BACKGROUND OF THE INVENTION

Japanese Patent Application Laid-Open No. 5-110941 discloses a prior art. This prior art is characterized in having an output control circuit which reads out output data for each field from a photosensitive section of the CCD image pickup device through a transfer section, and reads out again output data for one line of the photosensitive section, synchronously with the first horizontal synchronizing signal after readout of the output data for each field, so that a level difference in black level can be corrected by a black level correction signal obtained for each field scan, without requiring manual adjustment.

Japanese Patent Application Laid-Open No. 2000-152098 discloses another prior art. This prior art comprises an OB level calculation unit of a picture signal obtained from an imager, a coefficient calculation unit and a subtraction circuit are provided. An OB level difference signal is generated by multiplying the output from the OB level calculation unit by a coefficient in the coefficient calculation unit, and the OB level difference signal is subtracted from the picture signal, using the subtraction circuit, to thereby correct the OB level difference.

FIG. 2 is a graph which shows an example of a conventional curve showing a relationship (b) between an exposure time (t) of a normal CCD image pickup device and an output luminance level (y).

Recently, small size, high performance and high function, and high speed have been achieved in the world of digital cameras. On the other hand, from the viewpoint of power consumption, it cannot be said that power consumption is clearly increasing, but neither be said that it is decreasing. As described above, power consumed by the equipments does not change. On the other hand, as small size and high speed have been achieved, temperature in the equipment increases, to thereby cause various problems.

Among these problems, characteristic deterioration due to heat is intense in the CCD image pickup device which has been widely used as an imager in a digital camera. When the characteristic is deteriorated due to heat, there are such problems that a significant point appears due to an increase of dark current in a unit of pixel, which is referred to as temperature flaw, quantity of saturated signals decreases, and dark current on the whole image increases. Among these, the increase of dark current on the whole image means that the increase is constructionally different between an OB (Optical Black) section, and an effective pixel section. This is because the OB section is covered with an aluminum shading film, and hence parasitic capacitance is generated between a photo diode and the aluminum shading film, thereby the surface level thereof becomes lower than that of the effective pixel section. This phenomenon is generally referred to as "OB level difference".

Therefore, the dark current component generally increases in the effective pixel section, but when the CCD signal is sampled by CDS (Correlated Double Sampling) in the subsequent stage, clamping is performed by designating the output level in the OB section as the black level. Hence, if the black level is different between the OB section and the effective pixel section, such a problem occurs that even if in a shaded state, the screen becomes bright as if light shines thereon.

In equipments which take motion pictures, such as video cameras, or in digital still cameras, under a so-called monitoring state, since the frame rate is constant at the time of low illuminance when the incident ray volume is small, the signal quantity of the CCD cannot be increases by making the exposure time long as in a camera. Hence, the CCD output is amplified in an amplifier in the subsequent stage. The level thereof is about 30 dB.

For example, if a gain of as large as 30 dB is multiplied under a condition that the OB level difference is 5 mV, only the dark current due to the OB level difference reaches a level of as large as 160 mV. This means that the reference signal level to be obtained has been reached only by the dark current. Thus, if the OB level difference is not corrected, considerable deterioration occurs in the image quality.

As explained above, the OB level difference means a variation in pedestal level due to heat, in other words, an offset quantity caused by sampling of the CCD output signal by the CDS.

SUMMARY OF THE INVENTION

It is an object of this invention to provide a method of and apparatus for processing method picture signal that can obtain the OB level difference at the best timing and with a minimum error, and can improve a problem occurring due to correction of the OB level difference.

The picture signal processing method according to one aspect of the present invention comprises calculating an OB level difference from the luminance signal levels of at least two frames which are exposed for proper exposure time and for exposure time different from the proper exposure time, the OB level difference being a difference in black level, which is a difference between an optical black level, being en electrical output level when there is no optical input with respect to a two-dimensional CCD image pickup device, and a black level of a picture signal, and correcting the OB level difference in an input step of a signal processing circuit.

The picture signal processing method according to another aspect of the present invention is employed in a digital still camera, the digital camera using an interlaced scanning type CCD, when a subject is sufficiently bright and a still picture is recorded in a frame period same as that of monitoring. The method comprises calculating an OB level difference correction amount at the time of readout of the still picture based on an OB level difference correction value immediately before recording, a rate of occurrence of dark current in the pixel section of the CCD and in a vertical transfer section, a frame period, and an actual exposure time in the frame period.

The picture signal processing method according to still another aspect of the present invention is employed in a digital still camera, the digital camera using an interlaced scanning type CCD, when a subject has low luminance, and at the time of still recording when exposure is performed over several frames, and when an OB level difference correction value calculated in a monitoring mode immediately before recording is calculated, a gain multiplied before entering into the signal processing apparatus is taken into consideration, and the OB level difference correction amount is multiplied by a negative gain, and further by the number of exposure frames, and this value is designated as the OB level difference correction amount at the time of readout of the still image.

The picture signal processing apparatus according to still another aspect of the present invention comprises an OB level difference correction circuit which calculates an OB level difference from the luminance signal levels of at least two frames which are exposed for proper exposure time and for exposure time different from the proper exposure time, the OB level difference being a difference in black level, which is a difference between an optical black level, being en electrical output level when there is no optical input with respect to a two-dimensional CCD image pickup device, and a black level of a picture signal, and corrects the OB level difference in an input step of a signal processing circuit.

The picture signal processing apparatus according to still another aspect of the present invention is provided in a digital still camera using an interlaced scanning type CCD, having an OB level difference correction circuit which calculates an OB level difference correction amount at the time of reading a still picture, from the OB level difference correction value immediately before recording, a rate of occurrence of dark current in the pixel section and in a vertical transfer section of the CCD, the frame period, and the actual exposure time in the frame period, when a subject is sufficiently bright, and the still picture is recorded in a frame period same as that of monitoring.

The picture signal processing apparatus according to still another aspect of the present invention is provided in a digital still camera using an interlaced scanning type CCD, having an OB level difference correction circuit which takes a gain multiplied before entering into the signal processing apparatus into consideration, when calculating an OB level difference correction value calculated in a monitoring mode immediately before recording, multiplies the OB level difference correction amount by a negative gain, and further by the number of exposure frames, and designates this value as the OB level difference correction amount at the time of readout of the still image, when a subject has low luminance, and at the time of still recording when exposure is performed over several frames.

Other objects and features of this invention will become apparent from the following description with reference to the accompanying drawings.

BRIEF DESCRIPTION OF THE DRAWINGS

FIG. 3A and FIG. 3B are timing charts which show an example of periodical calculation, being one embodiment of the present invention, FIG. 8A and FIG. 8B are timing charts which show an example of a restrictive calculation, being an other embodiment of the present invention, FIG. 11 is a graph which shows an example of a signal level in each section, when there is an OB level difference, and a subject including a highlight portion is photographed, FIG. 12 is a graph which shows an example of a signal level in each section, when there is an OB level difference, and a subject including a highlight portion is photographed, and each gain of R, G and B is corrected.

DETAILED DESCRIPTIONS

Preferred embodiments of the picture signal processing method and the picture signal processing apparatus according to the present invention will now be explained, with reference to the drawings.

Figure 1:
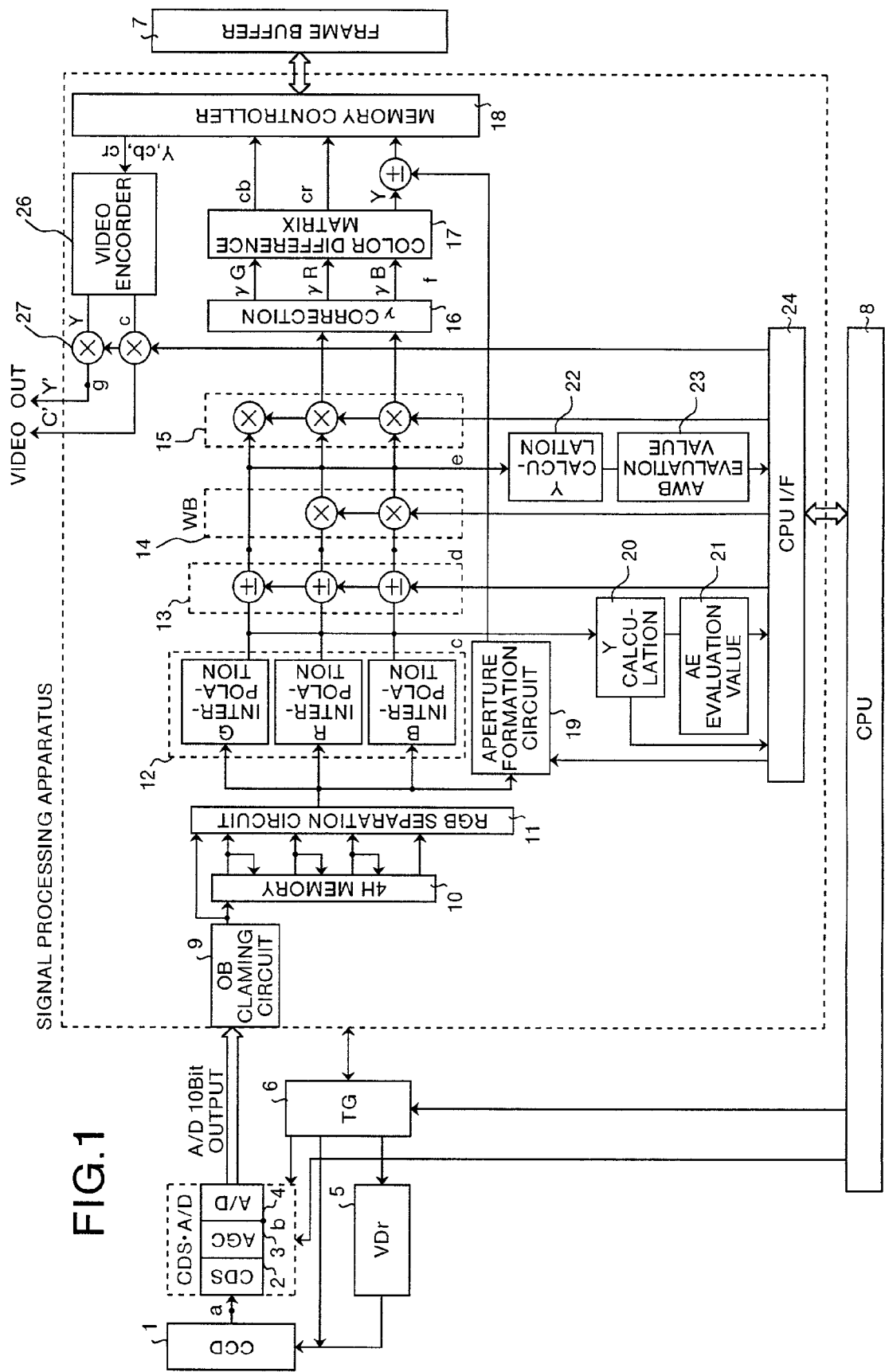
FIG. 1 is a block diagram which shows a circuit example for implementing the picture signal processing method and the picture signal processing apparatus according to the present invention.
Figure 2:
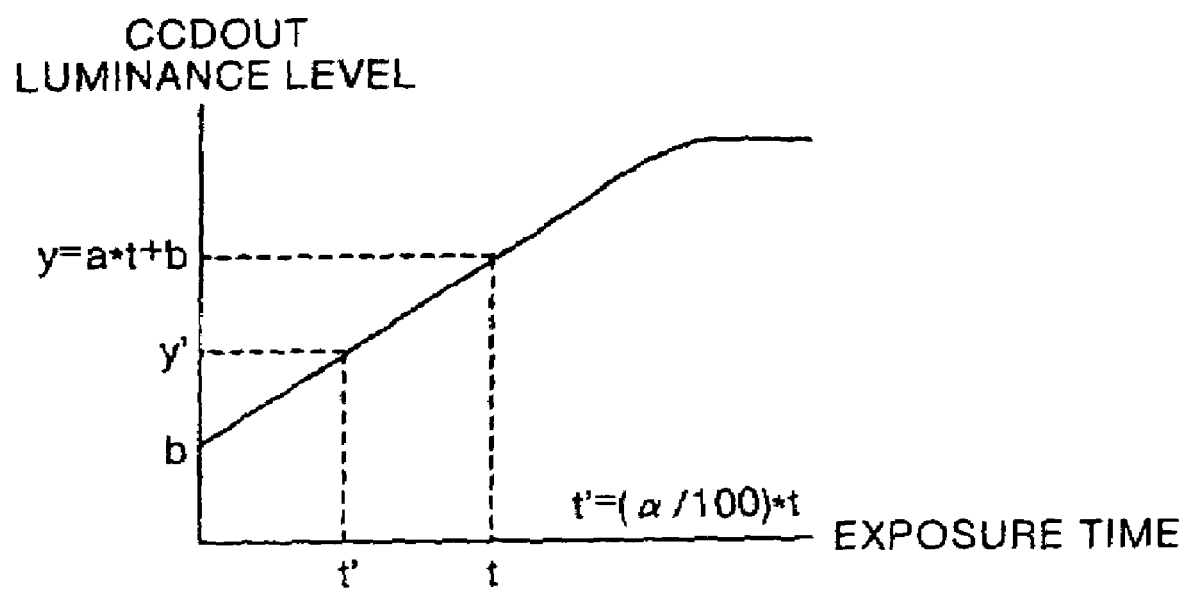
FIG. 2 is a graph which shows an example of relationship between exposure time of a normal CCD image pickup device and output luminance level.

FIG. 1 shows one example of a circuit for realizing the present invention. In FIG. 1, electric charge generated due to photoelectric exchange by a two-dimensional CCD image pickup device (hereinafter referred to as "CCD") is subjected to horizontal and vertical driving pulses output from a timing generator (hereinafter referred to as "TG") 6, and a vertical drive section (hereinafter referred to as "VDr") 5, and carried to a correlated double sampling, analog/digital conversion section (hereinafter referred to as "CDS·A/D". The CDS·A/D performs correlated double sampling of an output signal of a CCD1 by a CDS circuit 2, and a 10-bit digital signal which is multiplied by a predetermined gain (Gb) in an AGC amplifier circuit 3 and A/D converted in an A/D conversion section 4 is transmitted to a signal processing apparatus. In this example, 10-bit A/D conversion has been explained, but recently, it is becoming common to use 12-bit A/D conversion.

Change of the exposure time is performed by changing the number of electronic shutter pulses output from the TG 6, in the serial communication between a CPU 8 and the TG 6.

The data transmitted to the signal processing apparatus is clamped by an OB (optical black) claiming circuit 9, so that the level of the OB section becomes 0. At this time, even if there is a difference in level between the OB section and the effective pixel section, the data is transmitted as it is to a 4H memory circuit 10 in the next stage. In the 4H memory circuit 10, data for five horizontal periods is transmitted to a RGB separation circuit 11, together with the current signal. In the RGB separation circuit 11, the data is separated to R (red), G (green) and B (blue) signals, and interpolated in a RGB interpolation circuit 12, to thereby generate a signal corresponding to the respective plane picture of R, G and B.

Y is calculated by a Y-calculation device 20, and it is judged whether correction of the OB level difference is necessary by the CPU 8 through an interface 24, from the result obtained by exposing the calculated Y for at least two frames while changing the exposure time. If correction of the OB level difference is necessary, a predetermined value is subtracted therefrom by the OB level difference correction circuit 13, and the result thereof is sent to a white balance (hereinafter referred to as "WB") circuit 14. The WB circuit 14 multiplies the R and B signals by a gain based on the information from an AWB evaluated value output circuit 23.

The R, G and B signals output from the WB circuit 14 is then sent to a gain correction circuit 15. This gain correction circuit 15 has a role of multiplying the R, G and B by a gain so as to supplement the amount subtracted by the OB level difference correction circuit 13, when the correction of the OB level difference is performed, and of performing correction so that when the OB level difference is calculated, there is no sense of incompatibility in the output video signal, even if the exposure time is deviated from the proper exposure.

When the correction of the OB level difference is performed, the saturation level of the G output at a point "e", which is an output point from the WB circuit 14, becomes for example 240 or 950, respectively, different from the value that should be 255 in 8-bit processing, or 1023 in 10-bit processing. Therefore, the gain correction circuit 15 multiplies R, G, and B, respectively, by a gain of about 0.5 dB in the former instance, and of about 0.65 dB in the latter instance.

When the OB level difference is calculated, the CPU 8 instructs the TG 6 to change the number of electronic shutters. For example, it is assumed that when calculation of the OB level difference is performed for two frames from the n-th frame, exposure is performed for the number of electronic shutters, for the exposure controlled by the automatic exposure control section (hereinafter referred to as "AE") up to the n-th frame, and then the number of electronic shutters is changed in order to change the exposure time in the n+1-th frame. At this time, the gain correction circuit 15 multiplies the n+1-th frame by 6 dB, thereby the same output level as that of the n-th frame can be obtained.

This gain correction should be performed in the subsequent stage in the OB level difference correction circuit 13 and in the preceding stage of a γ correction circuit 16. Because, even if gain correction is performed before the correction of OB level difference, if subtraction is made in the OB level difference correction circuit 13, the matter explained so far is meaningless (it does not solve a problem that full-range cannot be obtained), and if gain correction is in the subsequent stage of the γ correction circuit 16, since nonlinear processing is performed in the γ correction circuit 16, correction cannot be performed by a simple multiplication circuit.

The R, G and B signals are then sent to the γ correction circuit 16, and subjected to the non-linear processing, thereby γR, γG and γB are output. The γR, γG and γB signals are converted in such a manner that RGB is converted to YcbCr, by a color difference matrix circuit 17. An aperture component formed by an aperture formation circuit 19 is mixed to the Y signal, and sent to a frame buffer 7 through a memory controller 18.

The aperture formation circuit 19 is a circuit which forms an outline emphasizing component, and has set values such as setting of a threshold for an input level change for emphasizing the outline (core ring level), degree of outline emphasis (aperture gain) and limitation of strength of the outline emphasizing component (limit). For example, when the OB level difference is calculated, a gain is multiplied for the amount by which the exposure time is changed, by the gain correction circuit 15. However, if the gain is multiplied, noise level also increases. Therefore, measures are taken, for example, the core ring level is increased so that the outline emphasis is not performed for the noise component. As a result, more natural image can be obtained.

Lastly, the picture signal stored in the frame buffer 7 is read out for the next frame by the memory controller 18, and output to the outside through a video encoder 26.

The above is the flow of a series of signals. Next, the actual OB level difference calculation sequence during monitoring will be explained.

Figure 4A:
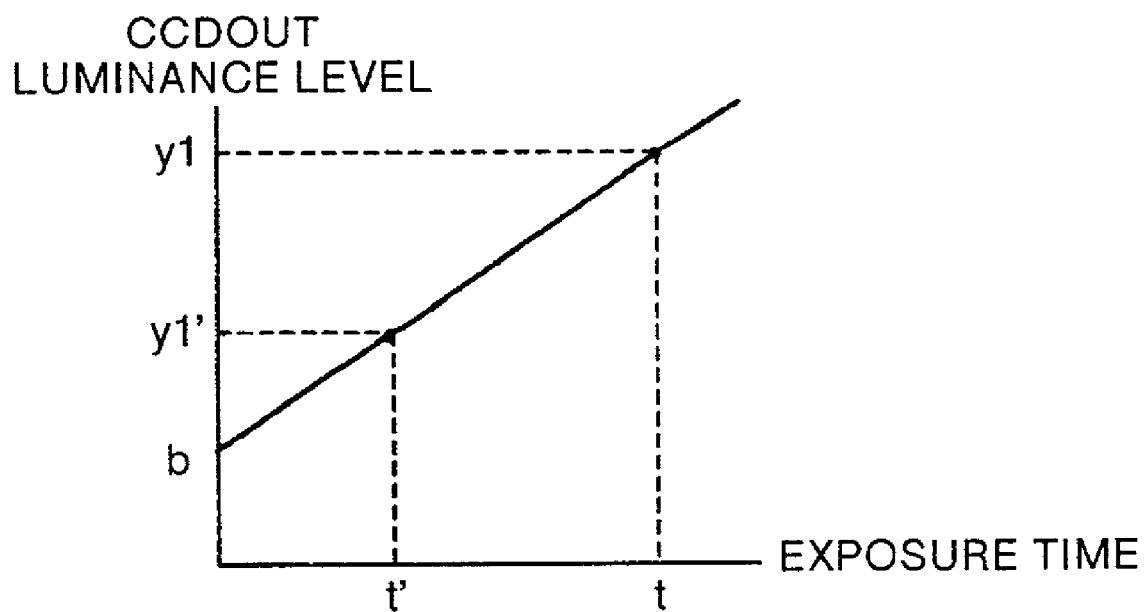
FIG. 4A and FIG. 4B are graphs which show an example of relationship between exposure time and CCD output luminance level, when the periodical calculation is performed.

FIG. 3A, FIG. 3B, FIG. 4A, and FIG. 4B show the cases when calculation of the OB level difference is periodically performed. FIG. 3A and FIG. 4A represent cases when the exposure time is changed to obtain the exposure y1 and y1'. The y1 and y1' are read out in the next frame of the exposure frame, sent to the signal processing apparatus to thereby perform calculation of the OB level difference as described above. This period is indicated as b1.

To the OB level difference b1 calculated in the period b1, a corresponding OB level difference correction amount is set from the next frame required for calculation by the OB level difference correction circuit 13. By performing the above operation repetitively with an interval of certain period, during the monitoring operation, the OB level difference correction amount is updated. Calculation of the OB level difference is performed with an interval of certain period so that exposure is performed without deviating from a reference exposure. This interval may be determined so as to match the characteristic of the equipment, in which immediately after power on of the equipment, temperature in the equipment increases within a short period of time, but after monitoring for a long period of time, temperature in the equipment starts to saturate, and the change thereof becomes dull.

Figure 4B:
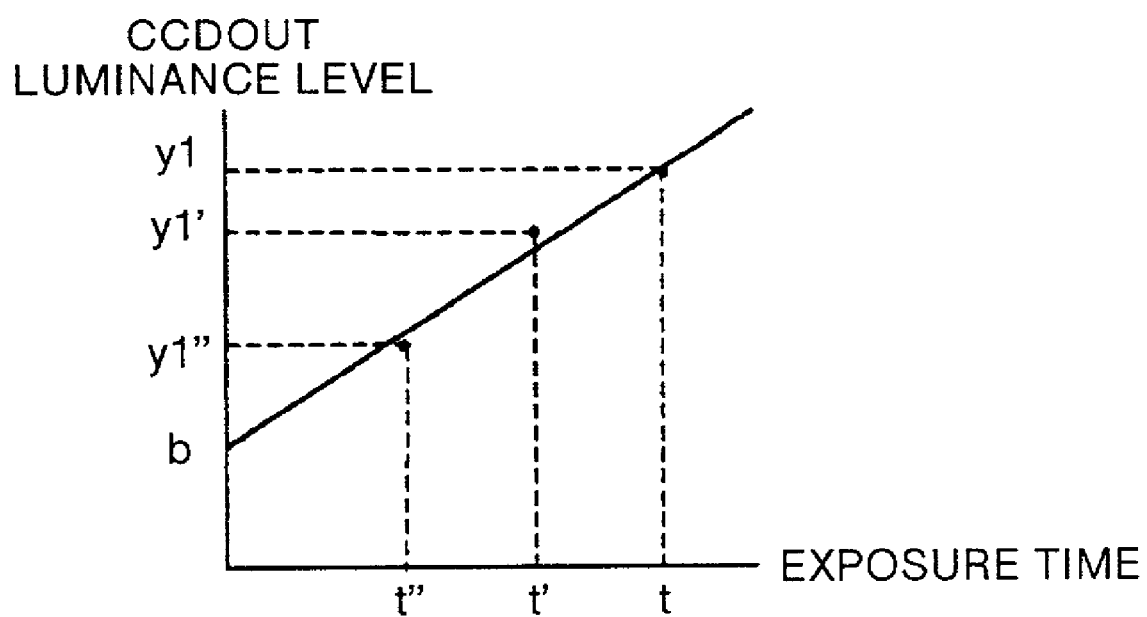

FIG. 3B and FIG. 4B represent cases when calculation of the OB level difference is performed periodically, but there is shown a instance that exposure is changed three times to calculate the OB level difference once. The respective exposure is shown by y1, y1', and y1". If exposure is performed for many times in which exposure quantity is different, and y values thereof are collinearly approximated to thereby obtain the value b1, deviation with respect to the original OB level difference can be reduced. However, since time is necessary for calculating the value b, the possibility that the luminance of the subject may be changed abruptly in one sequence (the photographing frame changes) becomes high, and hence about three times can be considered to be appropriate.

FIG. 5A, FIG. 5B, and FIG. 6A to FIG. 6C show the instance when calculation of OB level difference is regularly performed. If regular calculation is performed in this manner, it is not necessary to use a timer, thereby the control software can be simplified. Also, in view of calculation of OB level difference, there is a merit in that the OB level difference appropriate for the current situation can be updated at all times, since it is calculated every time.

Figure 5A:
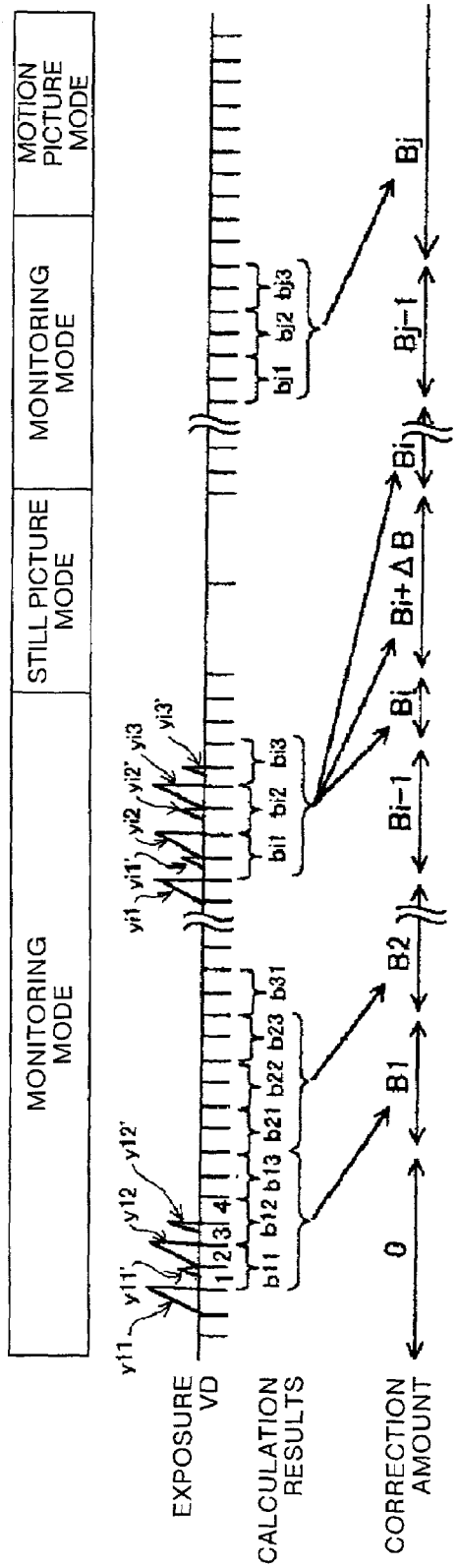
FIG. 5A and FIG. 5B are timing charts which show an example of regular calculation, being an other embodiment of the present invention.
Figure 6A:
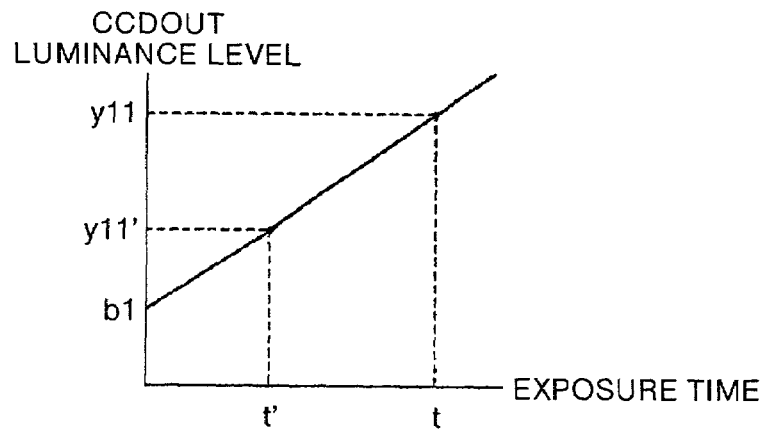
FIG. 6A to FIG. 6C are graphs which show an example of relationship between exposure time and CCD output luminance level, when the regular calculation is performed.
Figure 6B:
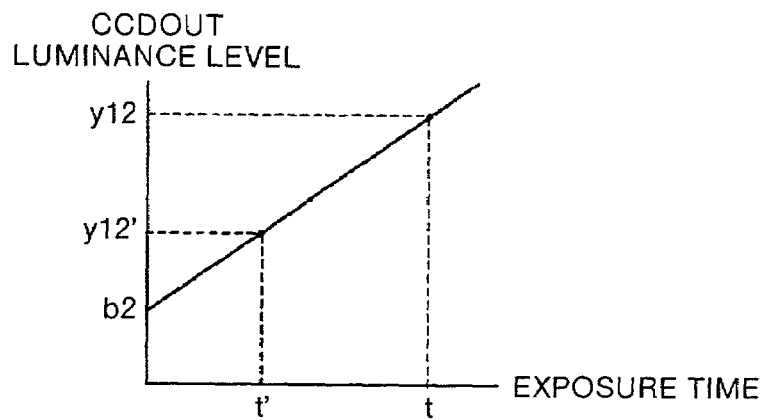
Figure 6C:
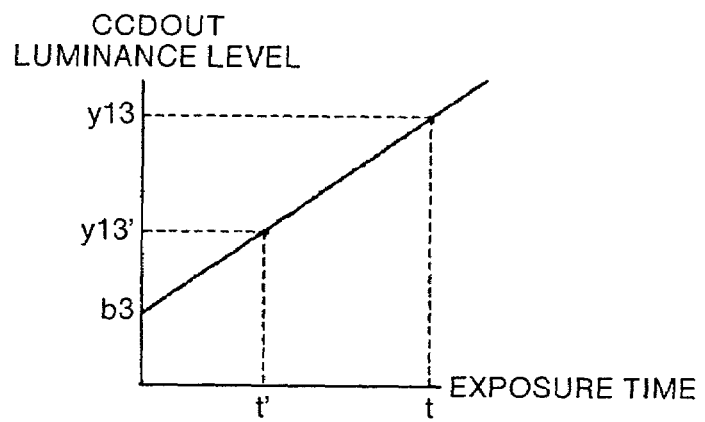

FIG. 5A represents the case in which calculation of OB level difference is regularly performed, in which appropriate exposure and exposure shorter than the appropriate exposure are designated as one sequence. Three sequences are designated as one set, and a value B1 to be actually corrected is obtained, using an average of b11, b12 and b13 obtained in each sequence. A graph which shows this instance is shown in FIG. 6A to FIG. 6C.

Figure 5B:
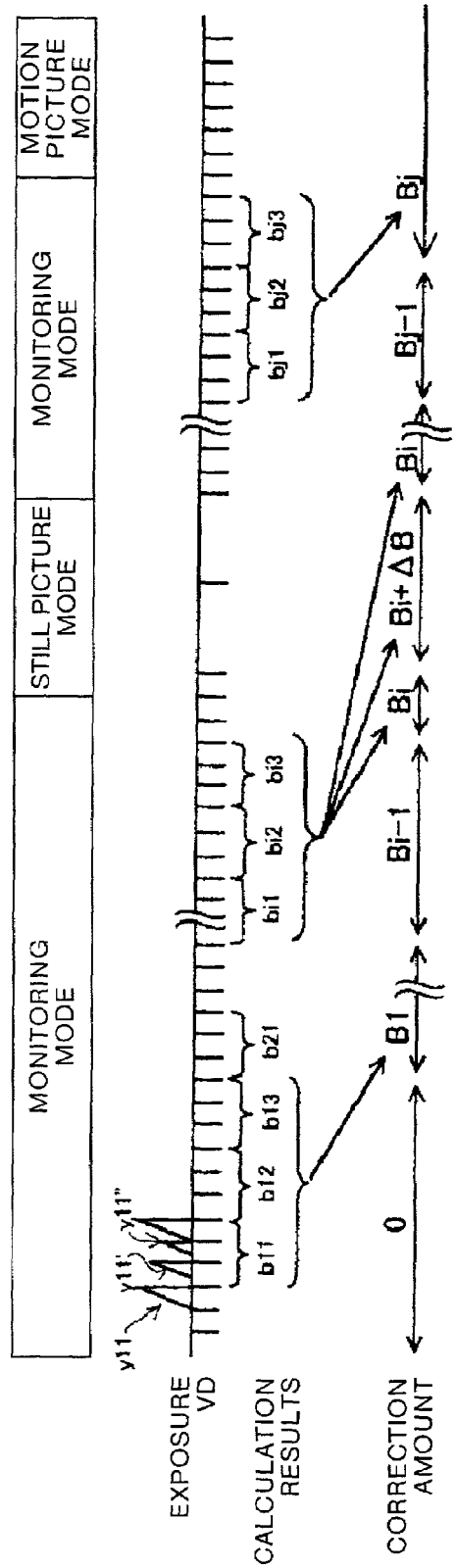

FIG. 5B shows the case in which one sequence is performed three times, which is then repeated three times with the exposure time being changed, thereby B1 is calculated using 9 frames in total.

Figure 7:
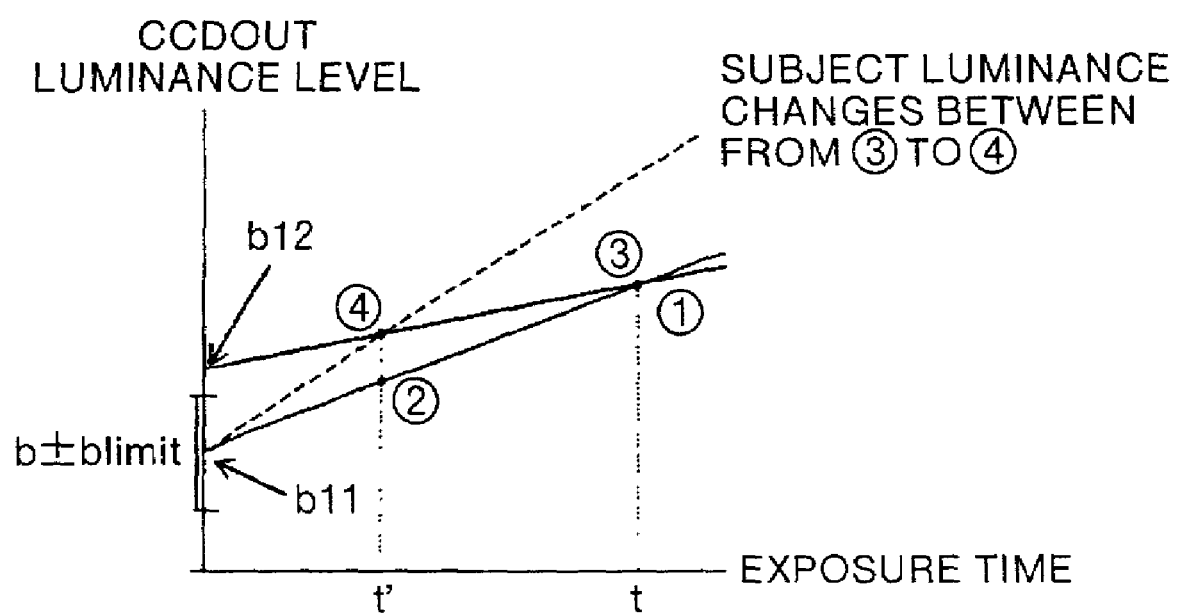
FIG. 7 is a graph which shows an example of relationship between exposure time and CCD output luminance level in the regular calculation, and a graph which shows an example when the OB level difference changes largely.
Figure 9:
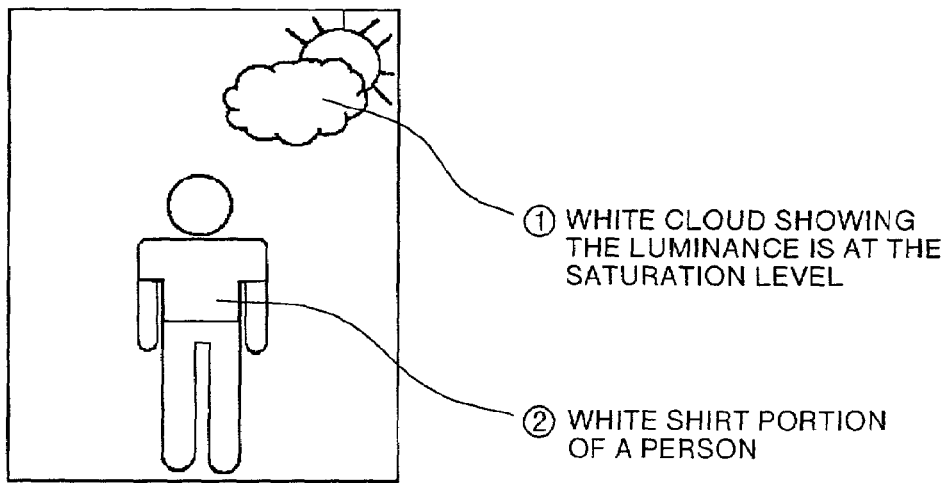
FIG. 9 is a photographing visual field diagram which shows an example of a subject including a highlight portion.
Figure 10:
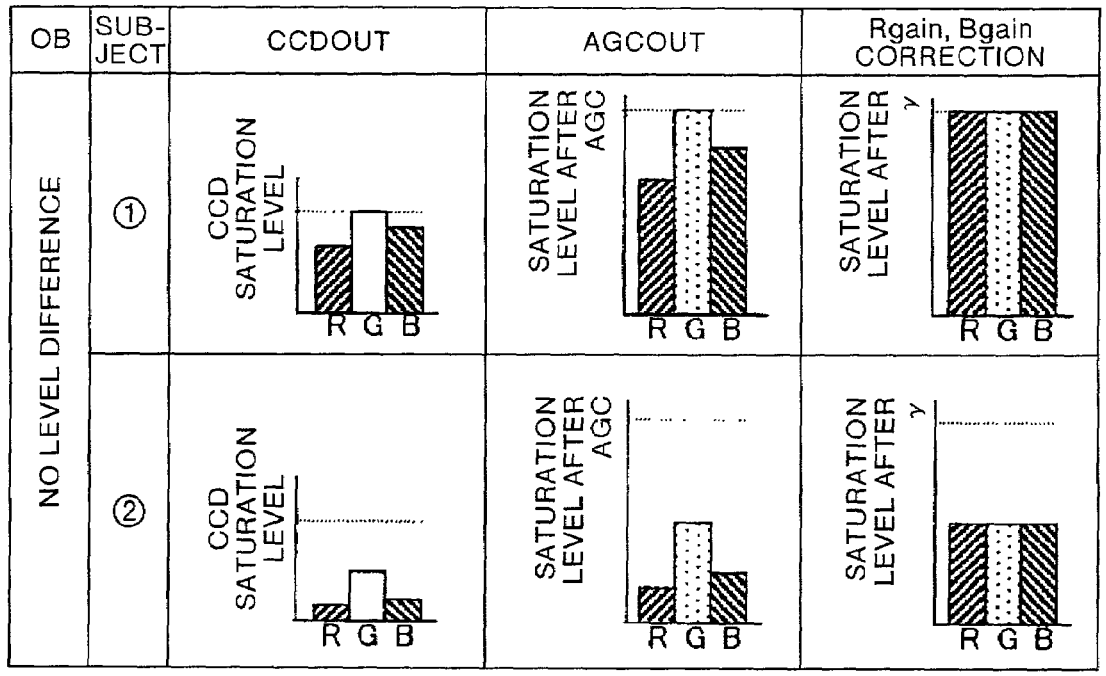
FIG. 10 is a graph which shows an example of a signal level in each section, when there is no OB level difference, and a subject including a highlight portion is photographed.

FIG. 7 indicates that when the CCDOUT luminance level in the frames 1, 2, 3 and 4 in FIG. 5A is in the relationship as shown in the figure, and if there is an abrupt change in the subject luminance between frame 3 to frame 4, b12 obtained from the approximate of 3 and 4 becomes a value deviated from b±blimit having a certain width with respect to a value b obtained from the previous set, and hence when B1 is determined, this value is excluded from the calculation target. The OB level difference correction amount does not change in such an abrupt manner, and hence in such a instance, it can be judged that the luminance of the subject has been changed. In this manner, when a result deviated from the previous OB level difference correction amount is obtained, such a result is excluded from the target to be averaged, to thereby increase the accuracy of the correction amount.

FIG. 8A and FIG. 8B represent instances when calculation of OB level difference is performed using before recording a still picture. Before recording a still picture, focus operation is necessary. Hence, when a user uses a camera, the angle of view hardly changes. If calculation of OB level difference is performed utilizing this moment, there is the possibility that a threshold as shown in FIG. 5 may not be necessary. Also, since correction of OB level difference is not performed during monitoring, a secondary problem, for example a problem that an increase of noise maybe felt, does snot occur. If initiation of the calculation sequence of the OB level difference is performed based on a release signal, it is not necessary to use a timer which is required when calculation of OB level difference is performed with an interval of certain period.

FIG. 8A shows the case in which calculation of OB level difference, in which two calculations are designated as one sequence, is performed for three sets, and the average thereof is recorded, and FIG. 8B shows the case in which calculation of OB level difference, in which three calculations are designated as one sequence, is performed for three sets, and the average thereof is recorded.

Next, a case of a device whose main function is to record still pictures such as a digital still camera is discussed. Thanks to progress in integration technology of pixels in recent years, interlace type CCDs are adopted in digital still cameras in many cases because cameras with highly integrated pixels can be available easily. A structure of the interlace scan type CCD of structure roughly comprises a pixel section and a vertical transfer section. Most of thermal dark current is generated in these two fields. Hereafter, amount of pixel section dark currents is defined as e1 and amount of vertical transfer section dark currents is defined as e2. As mentioned above, since the most of the thermal dark current is generated in the pixel section and the vertical transfer section, the contents of the amount of OB level differences computed during monitoring can be approximately expressed with e1+e2. However, in the interlace scan type CCD, in the case of recording, it is common to perform discharging the unnecessary charge generated on a vertical transfer way, or so-called vertical transfer way sweeps. Therefore, in the case of recording, it is necessary to deduct the amount of vertical transfer section dark currents e2. In addition, ratio of e1 to e2 is known value at the time of recording because it is determined at the designing stage of the CCD.

However, an error is still large only by taking this ratio into consideration. Because variation of amount e1 of the pixel section dark currents has to be taken in consideration, since exposure-time control is carried out using an electronic shutter within an exposure frame. Namely, since charge accumulated on the pixel section is swept away into a substrate during the period when the electronic shutter is used, not only the charge produce by photo electric conversion but also the unnecessary charge generated by the dark current are swept away.

Figure 13:
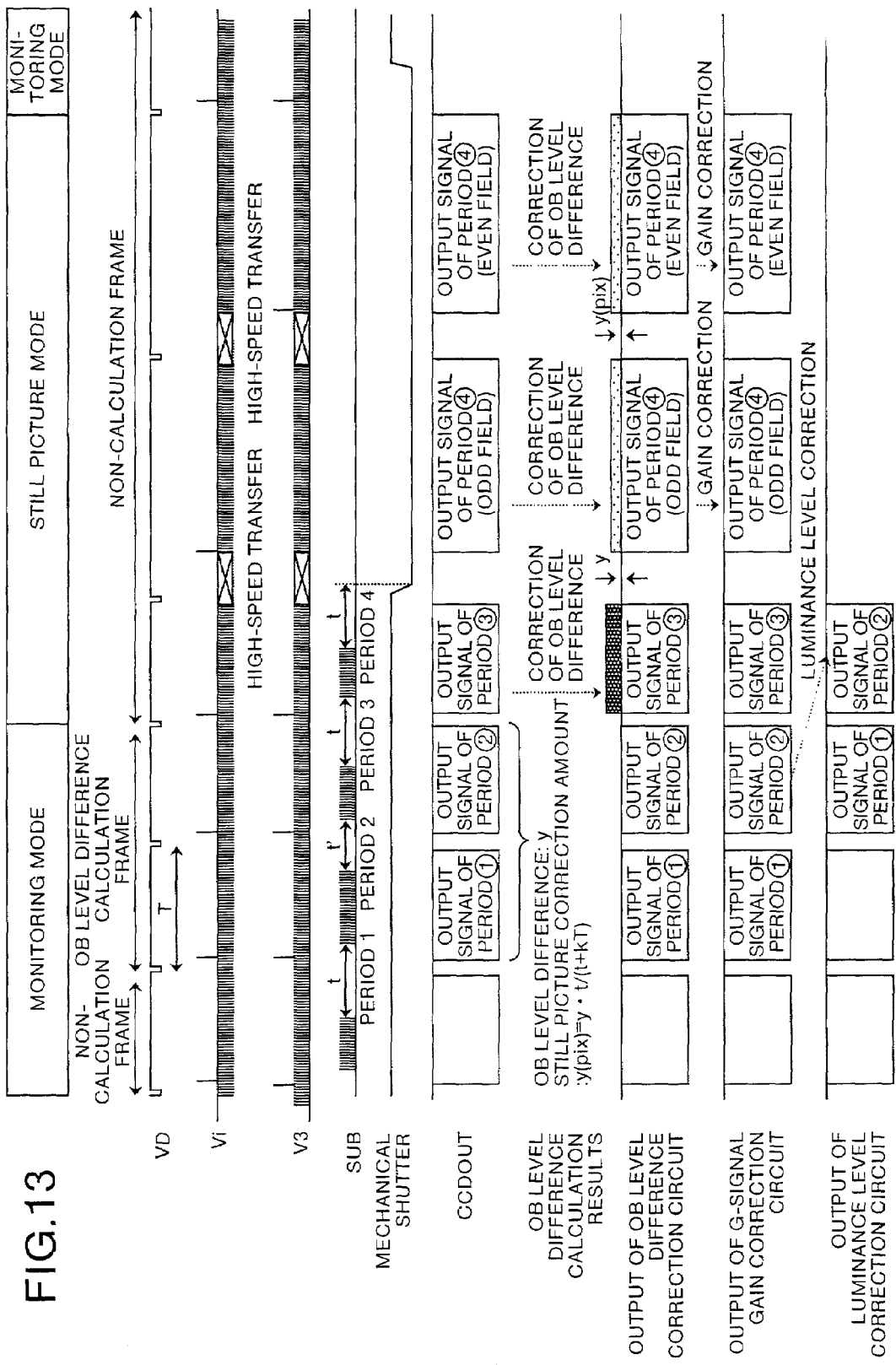
FIG. 13 is a timing chart which shows an example of OB level difference correction, when a still picture is recorded by a digital still camera using an interlaced scanning type CCD.
Figure 14:
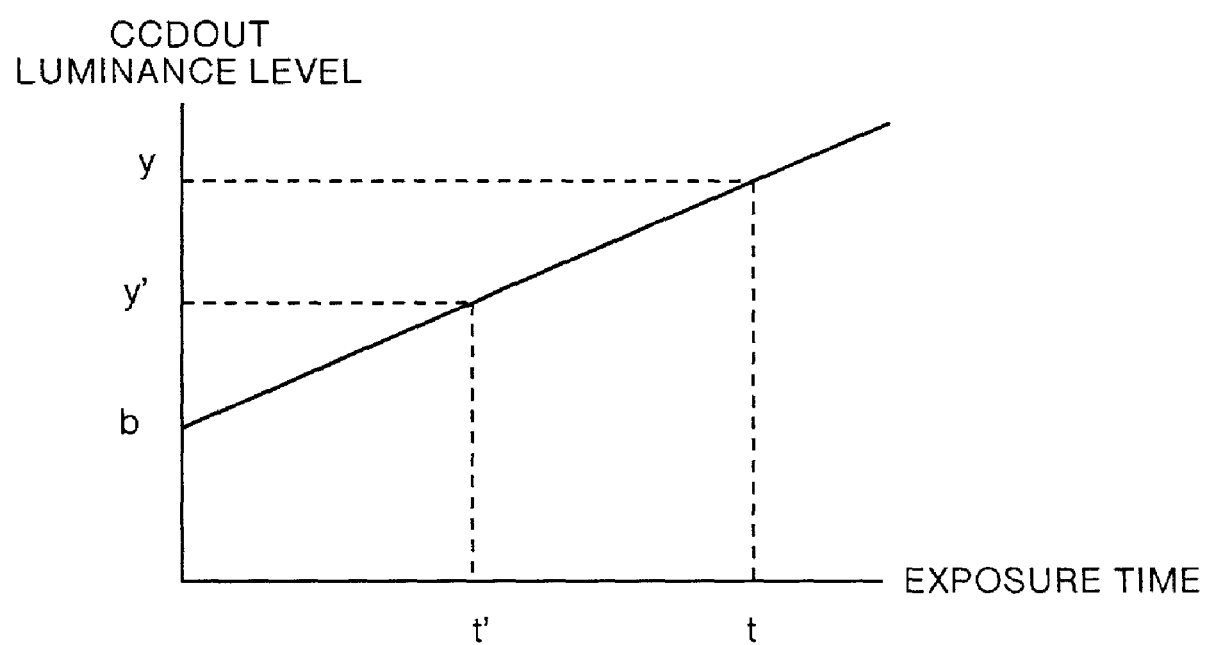
FIG. 14 is a graph which shows relationship between exposure time and CCD output luminance level, when the correction of OB level difference is performed.

Taking above matters into consideration, OB level difference correction value (pix), in the case of recording a still image using the digital still camera with interlace scan type CCDs is calculated. The value y (pix) is subtracted at the time of recording (refer to FIG. 13).

First, regarding the amount of OB level difference correction, when an amount deriving from the pixel section is defined as y (pix) and an amount deriving from the vertical transfer section as y (V), the amount of OB level difference correction y, calculated during monitoring, is represented by equation (5) shown below.

$$y=y(\text{pix})+y(V) \quad (5)$$

Here, y(pix) is represented by equation (6).

$$y(\text{pix})=x \cdot t/T \quad (6)$$

where T is frame period during monitoring, t is a period when the electronic shutter pulse is not outputted within the frame period, and x is the amount of OB level difference correction which will be generated in the frame period during monitoring when the electronic shutter pulse is not outputted at all.

On the other hand, y (V) is represented by equation (7).

$$y(V)=e2/e1 \cdot x=kx \quad (7)$$

where k is the dark current generating ratio (e2/e1) of the pixel section and the vertical transfer section, which is available from the characteristic of the CCD.

Therefore, the equation (5) is transformed to equation (8).

$$y=x \cdot t/T+kx \quad (8)$$

By solving equation (8) about x, x is represented by equation (9).

$$x=y/(t/T+k) \quad (9)$$

By substituting x represented by the equation (9) into equation (6), OB level difference correction value at the time of the recording a still picture, which should be subtracted, can be available by equation (10).

$$y(\text{pix})=y \cdot t/(t+Tk) \quad (10)$$

The amount of OB level difference correction at the time of recording the still picture calculated above, may include large amount of error in the case of long time exposure, which is unique to a digital camera. The definition of the long time exposure is that, when the object to be photographed is dark, exposure control is performed continuously using a plurality o frame periods during monitoring. Above equations are for a situation where the OB level difference correction for only one frame is taken in consideration. Therefore, modification of the equation is necessary when considering the situation for the long time exposure.

When long time exposure is necessary, since frame rate is constant during the monitoring period, CCD signals are generally multiplied by gain before inputted into a signal processor. However, the signals are returned to the signals with original basic gain when - they are recorded. Therefore, the OB level difference correction amount calculated during the monitoring period includes the gain multiplied. Accordingly, it is necessary to subtract the gain multiplied.

Figure 15:
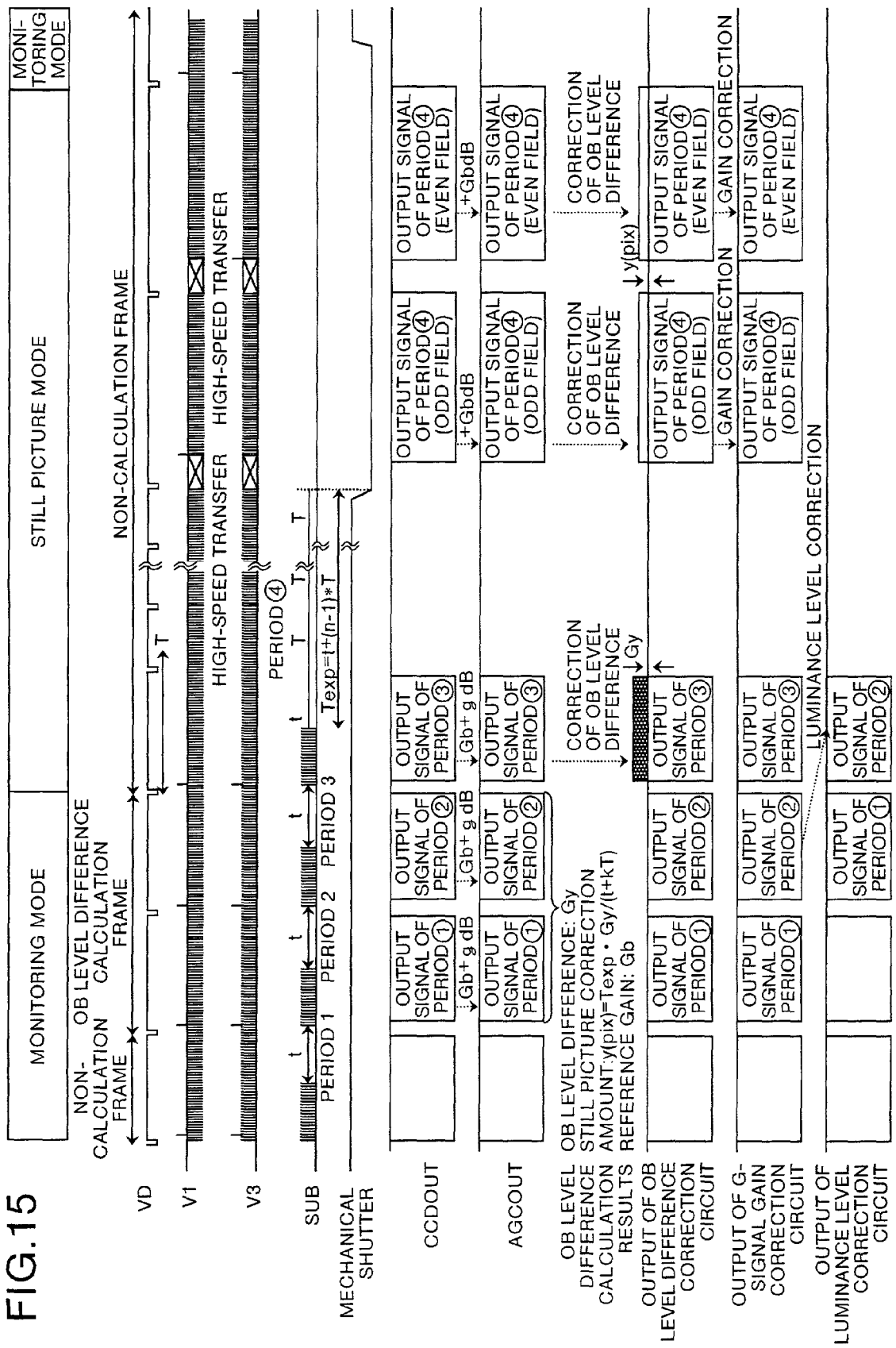
FIG. 15 is a timing chart which shows an example of operation for obtaining an OB level difference correction value at the time of recording to be subtracted by a digital still camera, in the long exposure.

OB level difference correction value at the time of the recording to be subtracted in the case of long time exposure is calculated as follows, taking above matters into consideration (refer to FIG. 15).

First, g representing increase of gain, multiplied during the monitoring period, for a reference gain is calculated by equation (11)

$$g = 20 \log X \quad (11)$$

where X is a variable indicating multiple between the gain at the time of monitoring and the gain at the time of ordinary recording. X is calculated by equation (12) which is derived from equation (11).

$$X = 10^{\wedge}(g/20) \quad (12)$$

Within the OB level difference correction amount, an amount deriving from the pixel section is defined as Gy(pix), and an amount deriving from the pixel section and without gain multiplied is defined as y(pix). Gy(pix) and y(pix) are represented by following equations (13) and (14) respectively.

$$Y(\text{pix}) = Gy(\text{pix})/X \quad (13)$$

$$Gy(\text{pix}) = y(\text{pix}) \cdot X \quad (14)$$

At the time of the long time exposure, equation (10) stands good for the $1^{st}$ frame of the long time exposure. However, y in the equation (10) has to be replaced with Gy because the gain is multiplied. In and after the second frame, x is represented as defined before.

Therefore, Gy is represented by equation (15).

$$Gy(\text{pix}) = Gy \cdot t/(t+Tk) + (n-1) \cdot x \quad (15)$$

Moreover, x is represented by equation (16) which is derived from equation (9).

$$X = Gy/(t/T+k) \quad (16)$$

Therefore, Gy(pix) is solved as follows.

$$Gy(\text{pix}) = Gy \cdot t/(t+Tk) + (n-1) \cdot Gy/(t/T+k) = (t+(n-1) \cdot T) \cdot Gy/(t+kT)$$

Since t+(n−1) T represents actual exposure period Texp, Gy(pix) is further represented by following equation (17).

$$Gy(\text{pix}) = T\text{exp} \cdot Gy/(t+kT) \quad (17)$$

Finally, by substituting equation (14) for equation (17), y(pix) is available by equation (18).

$$y(\text{pix}) = T\text{exp} \cdot Gy/(X \cdot (t+kT)) \quad (18)$$

By above equations, OB level difference correction value at the time of the recording to be subtracted can be available, when recording a still picture using long time exposure.

As described above, in the present invention, when the OB level difference is calculated, the biggest cause that generates an error is that the subject luminance changes in one sequence. However, it can be expected by seeing the control value of the AE whether it is the time when the luminance change of the subject is abrupt, and hence calculation of OB level difference by choosing when the luminance change of the subject is small is also an effective measure.

The CPU 8 serves as a control unit which controls the operation of each section, and as a calculation unit which calculates the OB level difference and the like.

According to the method of and the apparatus for processing picture signal of one aspect of the present invention, the OB level difference is calculated from the luminance signal level of at least two frames having different exposure, thereby enabling correction of the level difference.

Moreover, by performing calculation of the OB level difference correction amount regularly, software control can be simplified, and correction of the OB level difference can be performed timely.

Furthermore, by performing calculation of the OB level difference correction amount periodically, correction of the OB level difference can be performed efficiently, according to need.

Moreover, by performing calculation of the OB level difference correction amount at a limited time when performing the focusing operation, the OB level difference can be calculated under the instance that an angle of view is hardly changed, and hence more accurate data for calculation of the OB level difference correction amount can be collected.

Furthermore, by performing calculation of the OB level difference correction amount at a limited time when a change in the automatic exposure control value is small, the OB level difference can be calculated under the instance that the luminance is hardly changed, and hence more accurate data for calculation of the OB level difference correction amount can be collected.

Moreover, a unit which judges whether there is a change in luminance during calculation of the OB level difference correction amount is provided. Therefore, more accurate data for calculation of the OB level difference correction amount can be collected.

Furthermore, necessary gain can be obtained by multiplying a picture signal by a predetermined gain calculated from the subtracted amount, for a signal level subtracted by the correction of OB level difference. Thereby, accurate color can be reproduced all over from a low luminance portion to a highlight portion, without loosing the white balance.

Moreover, noise amplified by the gain multiplied to the picture signal can be made not conspicuous by adjusting an image correction factor.

Furthermore, when an OB level difference correction amount is calculated, it is necessary to perform exposure for an exposure time deviated from a proper exposure time, but by multiplying the correction amount by a predetermined gain by a gain adjusting circuit in the subsequent stage, based on the changed exposure time, a certain level can be maintained for an output signal.

Moreover, when a motion picture is recorded, by stopping a calculation sequence of the OB level difference correction amount from the start of record, unpleasant portion is not left in the recorded image.

According to the method of and the apparatus for processing picture signal of another aspect of the present invention, by converting from the OB level difference correction amount obtained during monitoring using a proposed equation, an OB level difference correction amount corresponding to the still picture recording time of an interlaced scanning type CCD can be calculated.

According to the method of and the apparatus for processing picture signal of still another aspect of the present invention, by proposing a conversion equation corresponding to long exposure so that the conversion equation shown in the eleventh or twenty-third aspect is not set in the long exposure, the OB level difference correction amount at the time of still picture recording of the interlaced scanning type CCD can be calculated.

The present document incorporates by reference the entire contents of Japanese priority document, 2001-161323 filed in Japan on May 29, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A picture signal processing method comprising:
    calculating OB level difference from the luminance signal levels of at least two frames which are exposed for proper exposure time and for exposure time different from the proper exposure time, the OB level difference being a difference in black level, which is a difference between an optical black level, being an electrical output level when there is no optical input with respect to a two-dimensional CCD image pickup device, and a black level of a picture signal; and
    correcting the OB level difference in an input step of a signal processing circuit, wherein
    calculation of the OB level difference is regularly performed from immediately after power on of the equipment, the OB level difference obtained in each frame is multiplied, and a value obtained by dividing the multiplied OB level difference by the number of sampled frames is designated as a correction value, and when the result of calculation of the OB level difference considerably differs from the last result and exceeds a preset threshold, it is controlled such that the result is excluded from averaging.

2. The picture signal processing method according to claim 1, wherein when a picture signal is corrected in the input step of the signal processing circuit based on the obtained OB level difference correction value, a gain for the required amount is corrected by a gain adjusting circuit in a next stage of an OB clamping circuit in the signal processing circuit, corresponding to the OB level difference correction value.

3. The picture signal processing method according to claim 2, wherein an image correction factor is adjusted, so that random noise which increases according to the gain correction amount does not become conspicuous.

4. The picture signal processing method according to claim 1, wherein in a digital still camera which can perform correction of an OB level difference and can take motion pictures, at a time of actual recording, control is performed in such a manner that a correction value before the recording operation is automatically fixed, and after the recording operation, control returns to an original state.

5. A picture signal processing method comprising:
    calculating an OB level difference from the luminance signal levels of at least two frames which are exposed for proper exposure time and for exposure time different from the proper exposure time, the OB level difference being a difference in black level, which is a difference between an optical black level, being an electrical output level when there is no optical input with respect to a two-dimensional CCD image pickup device, and a black level of a picture signal; and
    correcting the OB level difference in an input step of a signal processing circuit, wherein
    calculation of the OB level difference is regularly performed from immediately after power on of the equipment and periodically with an interval of certain period, to multiply the OB level difference obtained in each frame, and a value obtained by dividing the obtained OB level difference by the number of sampled frames is designated as a correction value and when the result of calculation of the OB level difference considerably differs from the last result and exceeds a preset threshold, it is controlled such that the result is excluded from averaging.

6. The picture signal processing method according to claim 5, wherein when a picture signal is corrected in the input step of the signal processing circuit based on the obtained OB level difference correction value, a gain for the required amount is corrected by a gain adjusting circuit in a next stage of an OB clamping circuit in the signal processing circuit, corresponding to the OB level difference correction value.

7. The picture signal processing method according to claim 6, wherein an image correction factor is adjusted, so that random noise which increases according to the gain correction amount does not become conspicuous.

8. The picture signal processing method according to claim 5, wherein in a digital still camera which can perform correction of an OB level difference and can take motion pictures, at a time of actual recording, control is performed in such a manner that a correction value before the recording operation is automatically fixed, and after the recording operation, control returns to an original state.

9. A picture signal processing method comprising:
    calculating an OB level difference from the luminance signal levels of at least two frames which are exposed for proper exposure time and for exposure time different from the proper exposure time, the OB level difference being a difference in black level, which is a difference between an optical black level, being an electrical output level when there is no optical input with respect to a two-dimensional CCD image pickup device, and a black level of a picture signal; and
    correcting the OB level difference in an input step of a signal processing circuit, wherein
    calculation of the OB level difference is performed at a limited time when performing a focusing operation, and when the result of calculation of the OB level difference considerably differs from the last result and exceeds a preset threshold, it is controlled such that the result is excluded from averaging.

10. The picture signal processing method according to claim 9, wherein when a picture signal is corrected in the input step of the signal processing circuit based on the obtained OB level difference correction value, a gain for the required amount is corrected by a gain adjusting circuit in a next stage of an OB clamping circuit in the signal processing circuit, corresponding to the OB level difference correction value.

11. The picture signal processing method according to claim 10, wherein an image correction factor is adjusted, so that random noise which increases according to the gain correction amount does not become conspicuous.

12. The picture signal processing method according to claim 9, wherein in a digital still camera which can perform correction of an OB level difference and can take motion pictures, at a time of actual recording, control is performed in such a manner that a correction value before the recording operation is automatically fixed, and after the recording operation, control returns to an original state.

13. A picture signal processing method comprising:
calculating an OB level difference from the luminance signal levels of at least two frames which are exposed for proper exposure time and for exposure time different from the proper exposure time, the OB level difference being a difference in black level, which is a difference between an optical black level, being an electrical output level when there is no optical input with respect to a two-dimensional CCD image pickup device, and a black level of a picture signal; and
correcting the OB level difference in an input step of a signal processing circuit, wherein
calculation of the OB level difference is performed when a change in an automatic exposure control value is small, and when the result of calculation of the OB level difference considerably differs from the last result and exceeds a preset threshold, it is controlled such that the result is excluded from averaging.

14. The picture signal processing method according to claim 13, wherein when a picture signal is corrected in the input step of the signal processing circuit based on the obtained OB level difference correction value, a gain for the required amount is corrected by a gain adjusting circuit in a next stage of an OB clamping circuit in the signal processing circuit, corresponding to the OB level difference correction value.

15. The picture signal processing method according to claim 14, wherein an image correction factor is adjusted, so that random noise which increases according to the gain correction amount does not become conspicuous.

16. The picture signal processing method according to claim 13, wherein in a digital still camera which can perform correction of an OB level difference and can take motion pictures, at a time of actual recording, control is performed in such a manner that a correction value before the recording operation is automatically fixed and after the recording operation, control returns to an original state.

17. A picture signal processing apparatus comprising:
an OB level difference correction circuit which calculates an OB level difference from the luminance signal levels of at least two frames which are exposed for proper exposure time and for exposure time different from the proper exposure time, the OB level difference being a difference in black level, which is a difference between an optical black level, being an electrical output level when there is no optical input with respect to a two-dimensional CCD image pickup device, and a black level of a picture signal, and corrects the OB level difference in an input step of a signal processing circuit, wherein the OB level difference correction circuit performs calculation of the OB level difference regularly from immediately after power on of the equipment, multiplies the OB level difference obtained in each frame, and designates a value obtained by dividing the multiplied OB level difference by the number of sampled frames as a correction value; and
a control unit which controls the OB level difference correction circuit, so that when the result of calculation of the OB level difference considerably differs from the last result and exceeds a preset threshold, the result is excluded from averaging.

18. The picture signal processing apparatus according to claim 17, further comprising a gain adjusting circuit in a next stage of an OB clamping circuit in the signal processing circuit, which corrects a gain for a required amount corresponding to the OB level difference correction value, when a picture signal is corrected in the input step of the signal processing circuit based on the obtained OB level difference correction value.

19. The picture signal processing apparatus according to claim 18, further comprising a unit which adjusts an image correction factor, so that random noise which increases according to the gain correction value does not become conspicuous.

20. The picture signal processing apparatus according to claim 17, comprising a control unit which, at a time of actual recording, automatically fixes a correction value before the recording operation, and after the recording operation, returns to an original control, in a digital still camera which can perform correction of an OB level difference and can take motion pictures.

21. A picture signal processing apparatus comprising:
an OB level difference correction circuit which calculates an OB level difference from the luminance signal levels of at least two frames which are exposed for proper exposure time and for exposure time different from the proper exposure time, the OB level difference being a difference in black level, which is a difference between an optical black level, being an electrical output level when there is no optical input with respect to a two-dimensional CCD image pickup device, and a black level of a picture signal, and corrects the OB level difference in an input step of a signal processing circuit, wherein the OB level difference correction circuit performs calculation of the OB level difference immediately after power on of the equipment and periodically with an interval of certain period, multiplies the OB level difference obtained in each frame, and designates a value obtained by dividing the multiplied OB level difference by the number of sampled frames as a correction value; and
a control unit which controls the OB level difference correction circuit, so that when the result of calculation of the OB level difference considerably differs from the last result and exceeds a preset threshold, this the result is excluded from averaging.

22. The picture signal processing apparatus according to claim 21, further comprising a gain adjusting circuit in a next stage of an OB clamping circuit in the signal processing circuit, which corrects a gain for a required amount corresponding to the OB level difference correction value, when a picture signal is corrected in the input step of the signal processing circuit based on the obtained OB level difference correction value.

23. The picture signal processing apparatus according to claim 22, further comprising a unit which adjusts an image correction factor, so that random noise which increases according to the gain correction value does not become conspicuous.

24. The picture signal processing apparatus according to claim 21, comprising a control unit which, at a time of actual recording, automatically fixes a correction value before the recording operation, and after the recording operation, returns to an original control, in a digital still camera which can perform correction of an OB level difference and can take motion pictures.

25. A picture signal processing apparatus comprising:
an OB level difference correction circuit which calculates an OB level difference from the luminance signal levels of at least two frames which are exposed for proper exposure time and for exposure time different from the proper exposure time, the OB level difference being a difference in black level, which is a difference between an optical black level, being an electrical output level when there is no optical input with respect to a two-dimensional CCD image pickup device, and a black level of a picture signal, and corrects the OB level difference in an input step of a signal processing circuit, wherein the OB level difference correction circuit performs calculation of the correction value at a limited time when performing a focusing operation; and a control unit which controls the OB level difference correction circuit, so that when the result of calculation of the OB level difference considerably differs from the last result and exceeds a preset threshold, this the result is excluded from averaging.

26. The picture signal processing apparatus according to claim 25, further comprising a gain adjusting circuit in a next stage of an OB clamping circuit in the signal processing circuit, which corrects a gain for a required amount corresponding to the OB level difference correction value, when a picture signal is corrected in the input step of the signal processing circuit based on the obtained OB level difference correction value.

27. The picture signal processing apparatus according to claim 26, further comprising a unit which adjusts an image correction factor, so that random noise which increases according to the gain correction value does not become conspicuous.

28. The picture signal processing apparatus according to claim 25, comprising a control unit which, at a time of actual recording, automatically fixes a correction value before the recording operation, and after the recording operation returns to an original control, in a digital still camera which can perform correction of an OB level difference and can take motion pictures.

29. A picture signal processing apparatus comprising:
an OB level difference correction circuit which calculates an OB level difference from the luminance signal levels of at least two frames which are exposed for proper exposure time and for exposure time different from the proper exposure time, the OB level difference being a difference in black level, which is a difference between an optical black level, being an electrical output level when there is no optical input with respect to a two-dimensional CCD image pickup device, and a black level of a picture signal, and corrects the OB level difference in an input step of a signal processing circuit, wherein the OB level difference correction circuit performs calculation of the correction value when a change in an automatic exposure control value is small; and a control unit which controls the OB level difference correction circuit, so that when the result of calculation of the OB level difference considerably differs from the last result and exceeds a preset threshold, the result is excluded from averaging.

30. The picture signal processing apparatus according to claim 29, further comprising a gain adjusting circuit in a next stage of an OB clamping circuit in the signal processing circuit, which corrects a gain for a required amount corresponding to the OB level difference correction value, when a picture signal is corrected in the input step of the signal processing circuit based on the obtained OB level difference correction value.

31. The picture signal processing apparatus according to claim 30, further comprising a unit which adjusts an image correction factor, so that random noise which increases according to the gain correction value does not become conspicuous.

32. The picture signal processing apparatus according to claim 29, comprising a control unit which, at a time of actual recording, automatically fixes a correction value before the recording operation, and after the recording operation, returns to an original control, in a digital still camera which can perform correction of an OB level difference and can take motion pictures.

* * * * *